United States Patent [19]

Yamamoto et al.

[11] Patent Number: 4,477,821

[45] Date of Patent: Oct. 16, 1984

[54] LIGHT MODULATING APPARATUS

[75] Inventors: Masanobu Yamamoto, Yokohama; Nobuhiko Umezu, Chiba, both of Japan

[73] Assignee: Sony Corporation, Tokyo, Japan

[21] Appl. No.: 428,070

[22] Filed: Sep. 29, 1982

[30] Foreign Application Priority Data

Oct. 8, 1981 [JP] Japan .................................. 56-160711

[51] Int. Cl.³ ........................ G01D 15/14; G11B 7/00
[52] U.S. Cl. .................................. 346/108; 346/160; 358/285; 358/300
[58] Field of Search .............................. 346/108, 76 L

[56] References Cited

U.S. PATENT DOCUMENTS

| | | | |
|---|---|---|---|
| 4,144,539 | 3/1979 | Davie et al. | 346/160 |
| 4,201,994 | 5/1980 | Hoshito et al. | 346/108 |
| 4,213,158 | 7/1980 | De Benedictis | 358/296 |
| 4,307,408 | 12/1981 | Kiyohara et al. | 346/76 L |

Primary Examiner—Joseph W. Hartary
Assistant Examiner—Gerald E. Preston
Attorney, Agent, or Firm—Lewis H. Eslinger; Alvin Sinderbrand

[57] ABSTRACT

A light modulating apparatus for use with a recording apparatus for recording an information signal on a recording medium includes a light source and an acousto-optic modulator for modulating light emitted from the light source in response to a first electrical signal and thereby producing a modulated light signal for acting on the recording medium. Additionally, the apparatus includes an information signal source for providing an information signal, a high frequency oscillator for producing a carrier signal, a signal modulator for modulating the carrier signal by the information signal and providing therefrom the first electrical signal, and a photo-detector for detecting the modulated light signal and producing in response thereto a second electrical signal. The apparatus further comprises a peak-holding circuit for holding substantially a peak value of the second electrical signal, a comparator for comparing the peak value of the second electrical system with a reference signal and providing a corresponding error signal, and an amplitude modulator for controlling the amplitude of the carrier signal in accordance with the error signal.

20 Claims, 2 Drawing Figures

LIGHT MODULATING APPARATUS

BACKGROUND OF THE INVENTION

1. Field of the Invention

The present invention relates to a recording apparatus for recording information on a recording medium and more particularly relates to a light or optical recording apparatus which produces a modulated light or radiant energy signal for acting on the recording medium.

2. Description of the Prior Art

Typically, prior art light recording apparatus have included a laser light source which provides a light beam and a light modulator which modulates the light beam with an information signal and directs the modulated light beam toward a recording medium, for example, in the form of a recording disc, so that the information signal is recorded on the disc.

Laser light sources employed for use in such light recording apparatus include argon-ion and helium-cadmium lasers. Light modulators conventionally used include electro-optic and acousto-optic modulators in which the light refractive index of a medium within the light modulator is varied on the basis of the intensity of an electric field or the pressure of a sound/wave applied to the light refractive medium, respectively. Light modulators can also control the intensity of the light directed against the recording material so as to compensate for changes in the recording material sensitivity and/or changes in the linear velocity of the recording medium in respect to the modulated light beam, for example, as when the recording medium is a record disc rotated at a constant rotational speed and the light beam is made to scan a spiral path on the disc.

For controlling the light intensity, various devices have been used including optical filters, two electro-optic light modulators, one of which is used to modulate the light signal within the laser light source and the other to control the amount of light emitted from the laser light source, and current modulating means which control a current applied to a laser element within the laser light source. Light or optical recording apparatus incorporating such devices have undesirable features. For example, an optical filter is difficult to be electrically controlled and is unable to reduce noises caused by laser light emission. A device using two electro-optic light modulators can control the amount of light, reduce noise and modulate the signal but at a very high cost and by increasing the complexity of the optical system employed therein. Current modulating means can only be used for an argon-ion laser which restricts the type of laser that can be employed.

OBJECTS AND SUMMARY OF THE INVENTION

Accordingly, it is an object of this invention to provide a light modulating apparatus which avoids the above-mentioned disadvantages inherent in the prior art.

More specifically, it is an object of the present invention to provide a new and improved light modulating apparatus which controls the light intensity, provides signal modulation, and which substantially reduces the amount of noise recorded on the recording medium.

It is another object of the present invention to provide a new and improved light modulating apparatus which is less expensive to manufacture than prior art light modulating apparatus, does not require a substantially complex optical system to be used in conjunction therewith in recording an information signal on a recording medium, and which can employ an helium-cadmium laser as the laser light source.

In accordance with an aspect of this invention, a light modulating apparatus for use with a recording means for recording an information signal on a recording medium comprises a light source providing a light emission, an acousto-optic modulating element modulating said light emission in response to a first electrical signal and thereby producing a modulated light signal for acting on the recording medium, an information signal source providing the information signal, generating means for producing a carrier signal, signal modulating means for modulating the carrier signal by the information signal and providing therefrom the first electrical signal, detecting means for detecting the modulating light signal and producing in response thereto a second electrical signal, peak-holding means connected to the detecting means for holding substantially a peak value of the second electrical signal, comparator means for comparing the peak value of the second electrical signal with a reference signal and providing a corresponding error signal, and amplitude modulating means for controlling the amplitude of the carrier signal in accordance with the error signal.

DESCRIPTION OF A PREFERRED EMBODIMENT

Figure 1:
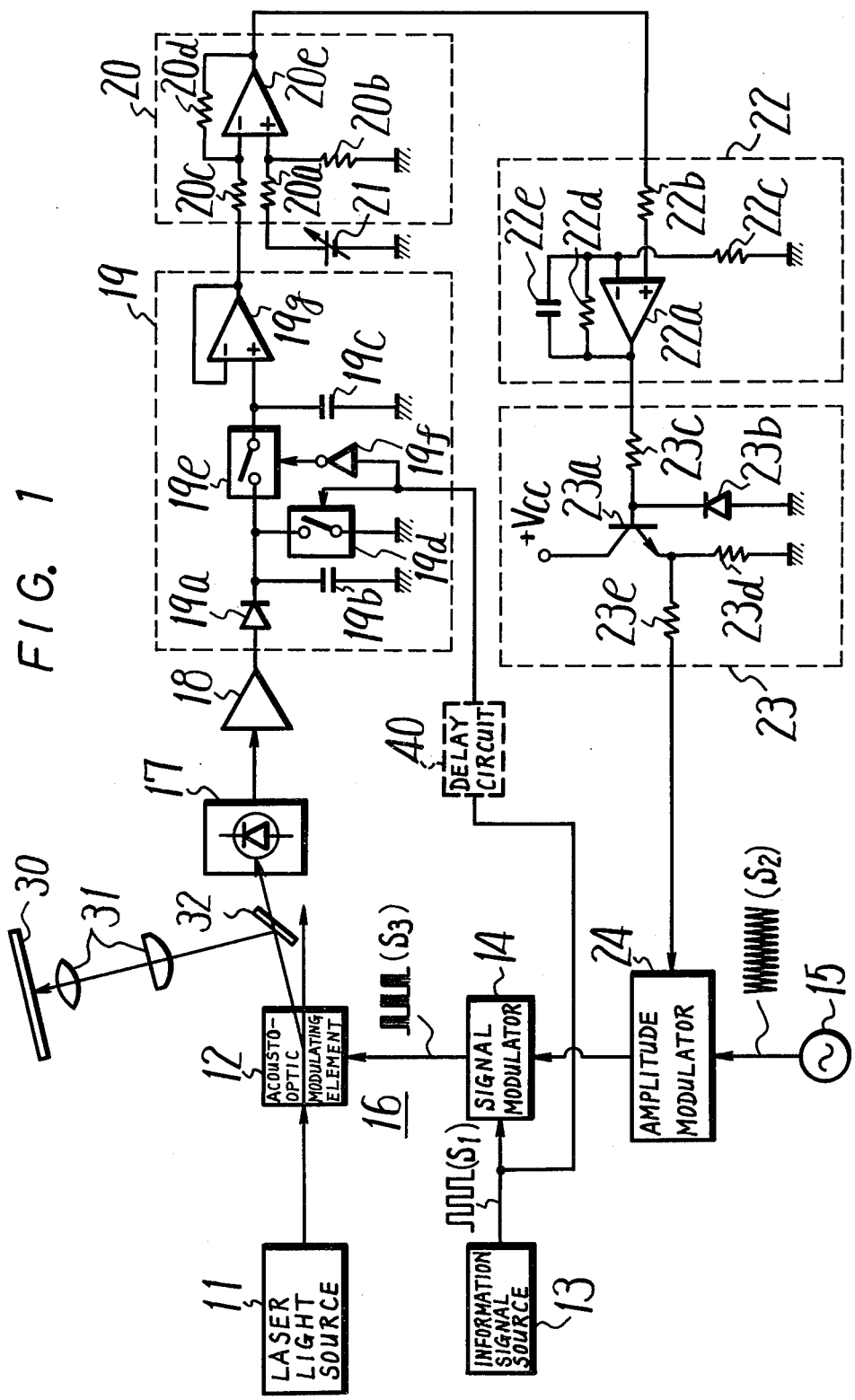
FIG. 1 is a block diagram schematically illustrating a light modulating apparatus in accordance with an embodiment of the present invention.

Referring to the drawings in detail, and initially to FIG. 1 thereof, it will be seen that, in a preferred embodiment of a light modulating apparatus 10 according to this invention which can be used as part of a recording apparatus for recording information on a recording medium, the light modulating apparatus 10 generally comprises a laser light source 11 which, for example, can be a helium-cadmium laser, producing a coherent light emission, an acousto-optic modulating element 12, an information signal source 13 producing an information signal to be recorded in the form of a binary coded signal S1, a signal modulator 14, and a generating means such as a high frequency oscillator 15 for providing a carrier signal S2. The acousto-optic modulating element 12, information signal source 13, signal modulator 14, and high frequency oscillator 15 combine to constitute an acousto-optic light modulator 16.

As will be disclosed hereinafter, first order diffracted light is emitted from acousto-optic modulating element 12. An optical or photo detector 17 detects the first order diffracted light emitted from acousto-optic modulating element 12 and converts a portion of the diffracted light into an electrical signal. A pre-amplifier 18 amplifies the electrical signal derived from photodetector 17. A peak-holding circuit 19 holds or maintains the peak value of the electrical signal derived from preamplifier 18 and thereby provides substantially a direct-current (dc) voltage which is applied to the inverting input of a comparator 20. Comparator 20 compares the dc voltage from peak-holding circuit 19 with a reference signal derived from a variable reference voltage source 21. Generally, the reference signal from variable reference voltage source 21 is set at an optimum value corresponding to the light sensitivity characteristics of the recording medium and the velocity of the recording medium during the recording operation. Additionally, light modulating apparatus 10 comprises a loop gain control circuit 22 connected to the output of comparator 20, a phase compensation circuit 23 connected to the output of loop gain control circuit 22 to compensate for any phase difference between the information signal and the first order diffracted light signal, and an amplitude modulator 24 connected between signal modulator 14 and high-frequency oscillator 15 which includes, for example, a voltage-controlled type amplifier. Photodetector 17, pre-amplifier 18, peak-holding circuit 19, loop gain control circuit 22, phase compensation circuit 23, and amplitude modulator 24 form a feedback loop which generates an error signal and, in accordance therewith, adjusts the amplitude of the carrier signal S2 produced by high-frequency oscillator 15, to thereby change the magnitude of the dc voltage to that of the reference signal.

Typically, the recording material is a photo-resist, coated on the surface of a recording medium 30, for example, in the form of a record disc, and has a sensitivity characteristic exhibiting a maximum sensitivity within a certain desired wavelength region.

The laser light source 11 produces coherent light and, in view of the optical system 31 used in recording the information signal on the recording medium 30, adjustments required to be made to the acousto-optic modulating element 12, and safety requirements, it is preferable that the laser light source 11 produce visible light. Additionally, the laser light source 11 need not emit a large amount of light assuming the output of the laser light source is constant in regard to the magnitude of the recording linear velocity of the recording material. It is also preferable that the laser light not be distorted.

The laser light source, when employing a recording material such as a photo-resist, can use an argon-ion laser having an output of several hundreds milliwatts or a helium-cadmium laser having an output of several tens of milliwatts. However, an argon-ion laser has a drop-out phenomenon which can result in bits of the information signal being lost, whereas a helium-cadmium laser exhibits no such dropout phenomenon. It should also be noted that sensitivity characteristic of a photo-resist exhibits a peak sensitivity in the ultraviolet region and that, although both the argon-ion and helium-cadmium lasers emit electromagnetic radiation in the visible region, the helium-argon laser emission is located closer to the ultraviolet region than the argon-ion laser emission. Still further, if an argon-ion laser is used and provides an acceptable level of ultraviolet radiation by increasing the light emission therefrom, the heat generated by the increased light can result in an undesirable change in the recording material quality and troublesome handling thereof. Thus, in the preferred embodiment of the present invention a helium-cadmium laser is used as the laser light source 11.

Figure 2:
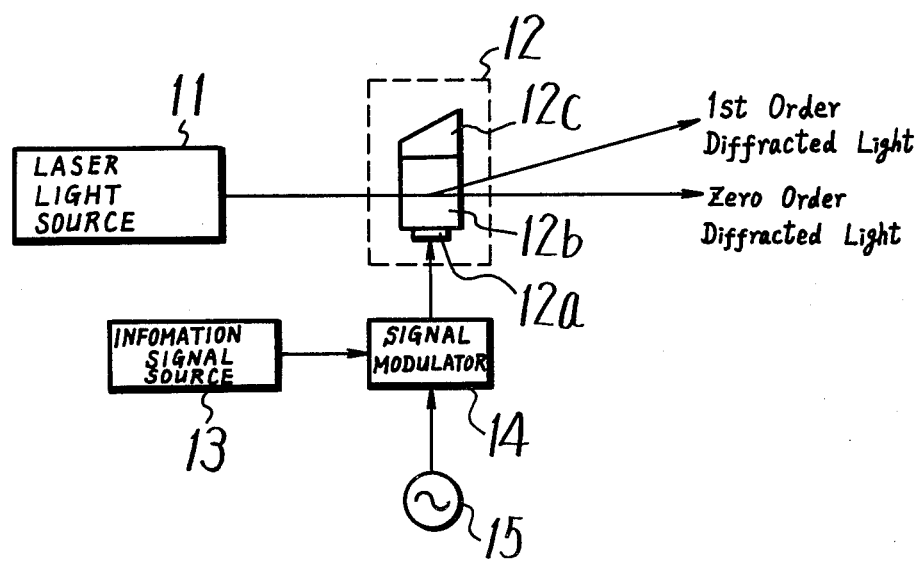
FIG. 2 is a block diagram schematically illustrating one type of an acousto-optic light modulator that may be utilized in the apparatus of FIG. 1.

The light modulating apparatus 10 can employ either an electro-optic modulating or acousto-optic modulating element but preferably utilizes the acousto-optic modulating element inasmuch as the acousto-optic modulating element 12 is not subject to as much fluctuation, that is, deviation in its output, when exposed to heat as is an electro-optic modulating element. Additionally, as illustrated in FIG. 2, an acousto-optic modulating element 12 is simpler to construct. The acousto-optic modulating element 12 is comprised of a transducer 12a for transducing the electrical signal from the signal modulator 14 into an acoustic, preferably ultrasonic signal, a light diffracting medium 12b which is exposed to the acoustic signal and through which the laser light emission passes, and an acoustical material 12c for absorbing the acoustic or ultrasonic signal and dissipating the energy therefrom by converting such energy to heat.

In operation, carrier signal $S_2$ with a frequency of, for example 80 MHz, generated by oscillator 15 is modulated by information signal $S_1$ in signal modulator 14 to produce a burst signal $S_3$ supplied to transducer 12a in modulating element 12. Transducer 12a converts burst signal $S_3$ into an ultrasonic signal which is introduced into light diffracting medium 12b. Light diffracting medium 12b changes its light refractive index in response to the magnitude of sound pressure produced by the ultrasonic signal to form a diffraction grating having a pitch corresponding to the wavelength of the sound wave which, in turn, corresponds to the information signal $S_1$. Such diffraction grating diffracts the light passing therethrough and, as a result thereof, the laser light emission, as it passes through the light diffracting medium 12b, is modulated thereby and produces a modulated light signal.

The diffraction of light can be explained in various ways depending on the wavelength of the sound wave, shape of the sound flux, and the wavelength of the laser light emission. Thus, the light diffraction may result from Raman and Brillouin scatterings. Whether Raman or Brillouin scatterings occur depends on the magnitudes of the light wavelength $\lambda_0/n$ traveling in the medium 12b having a refractive index n, the sound wavelength $\Lambda$, and the width of the sound flux extending in the direction of propagation of the light beam. To be more specific, if the Klein constant Q is defined by the following equation $$Q = 2\pi w \lambda_0 / n \Lambda^2 \quad (1)$$

the Raman scattering occurs when the Klein constant Q satisfies the condition $4\pi > Q > 0$, while the Brillouin scattering occurs when the Klein constant Q satisfies the condition $Q > 4\pi$.

The diffraction caused by the Raman scattering is analogous to the scattering of light emitted from a diffraction grating producing a sinusoidal wave distribution shape, and which includes zero and higher orders of diffracted light such as ± first order, ± second order and other higher orders. In contrast thereto and as shown in FIG. 2, the light diffraction provided by the Brillouin scattering produces only zero and first orders of diffracted light. Inasmuch as higher orders of diffracted laser-light are inefficient, Brillouin scattering is preferably utilized. Thus, in the embodiment shown in FIG. 1, the acousto-optic modulating element 12 is designed to provide a substantial Brillouin scattering, and the first order of diffracted light of the light modulating signal is detected by detecting means 17.

The intensity $I_1$ of the first order diffracted light is expressed by the following equation.

$$I_1 = I_0 R \sin^2(\eta^{\frac{1}{2}}) \quad (2)$$

In the above equation (2), $I_0$ represents the intensity of incident light, R represents the loss factor, that is, the amount of light lost at the surface and in the interior of modulating element 12 and $\eta$ represents the value given by the following equation.

$$\eta = \frac{\pi^2 w M_e P_s}{2\lambda_o^2 h} \quad (3)$$

In the above equation (3), w represents the width of the sound flux, that is, the cross-sectional width of the ultrasonic beam, h represents the height of the ultrasonic beam in the direction perpendicular to the width of its cross-section, $P_s$ represents the sound wave input, and $M_e$ represents the deflecting efficiency index of the medium. $M_e$ is also expressible by the following equation.

$$M_e = \frac{n^6 p^2}{\rho v^3} \quad (4)$$

In the above equation (4), n represents the refractive index of the medium, p represents the photoelasticity of the medium, $\rho$ represents the density of the medium, and v represents the sound velocity. The deflecting efficiency index $M_e$ can be used for comparing the deflection intensities of various kinds of medium assuming that the light wavelength, the cross-sectional shape of the ultrasonic beam, and the sound wave input are constant. Thus, the larger the value of $M_e$ the greater will be the intensity of the diffracted light and also the modulation effect. Further, from the above equations it will be seen that, the intensity $I_1$ of the first order of diffracted light can be modulated in intensity by the sound wave input $P_s$. Inasmuch as the sound wave input $P_s$ is determined by the value of the driving voltage of the carrier signal which is applied to transducer 12a of acousto-optic modulating element 12, by amplitude-modulating the carrier signal $S_2$ the first order of diffracted light can be modulated in intensity.

As earlier noted with reference to FIG. 1, the high frequency carrier signal $S_2$ generated by oscillator 15 is supplied to signal modulator 14 through amplitude modulator 24 for producing an electrical signal in the form of burst signal $S_3$. The information signal $S_1$, as previously mentioned, is binary coded, that is, $S_1$ has an ON and OFF signal mode. The signal $S_3$ is supplied to the acousto-optical modulating element 12 which modulates the coherent light emission from laser light source 11 and diffracts the light emission passing therethrough.

Inasmuch as acousto-optic modulating element 12 is designed to permit only the Brillouin scattering to occur, only the zero and first orders of diffracted light are produced at the output of modulating element 12. The modulated light signal emitted from acousto-optic element 12 output is then detected by photo-detector 17.

Spatially located between the acousto-optic modulating element 12 and photo-detector 17 is a beam splitter 32 which directs a portion of the modulated light signal through optical system 31 to recording medium 30 and thereby supplies the information signal $S_1$ to the recording medium 30.

A portion of the first order of diffracted light which passes through beam splitter 30 is detected by the photo detector 17 and converted therein to an electrical signal which is amplified by pre-amplifier 18, and supplied to the peak-holding circuit 19. It should be noted that such electrical signal supplied by photo-detector 17 will have the same waveshape as $S_1$ and therefore has a high level corresponding to an ON mode and a low level corresponding to an OFF mode.

As shown, the peak-holding circuit 19 can comprise, by way of example, a diode 19a, capacitors 19b and 19c, switches 19d and 19e, inverter 19f, and operational amplifier 19g. In such an embodiment, the electrical signal which is rectified by diode 19a is converted to a direct-current (dc) voltage, that is, peak-holding means 19 substantially maintains the electrical signal at its peak value, by filling in each valley, that is, the OFF mode of the signal through discharge of capacitors 19b and 19c and applying the modified electrical signal to a non-inverting input of operational amplifier 19g. The output of operational amplifier 19g and the inverting input thereof are connected together to form a feedback loop. Additionally, a delay circuit 40 is connected between information signal source 13, and switch 19d and switch 19e (through inverter 19f) to ensure that the information signal $S_1$ and the timing at which peak-holding circuit 19 holds or samples the signal from preamplifier 18 are in synchronism with each other.

The peak value of the rectified electrical signal which has been converted to a direct current voltage in peak-holding circuit 19 is then compared by comparator circuit 20 with a reference signal provided by variable voltage means 21. The comparator circuit 20 may comprise, for example, resistors 20a, 20b, 20c and 20d, and a comparator 20e. As shown, resistors 20a and 20b serve as a voltage divider with the voltage across resistor 20b applied to the non-inverting input of comparator 20e. The dc voltage signal supplied from peak-holding circuit 19 is applied to the inverting input of comparator 20e through resistor 20c. Resistor 20d is used as a feedback loop between the output of comparator 20e and its inverting input. The output signal produced by comparator 20e represents an error signal corresponding to the difference between the reference signal and dc voltage from peak-hold circuit 19.

Loop gain control circuit 22, as shown in FIG. 1, may be a typical gain control means well known in the art, and wherein the error signal produced by comparator circuit 20 is supplied to a non-inverting input of an operational amplifier 22a through a resistor 22b. The inverting input-to-ground potential is established by the voltage across resistor 22c. A feedback loop is connected between the inverting input and output of operational amplifier 22a and comprises a resistor 22d and capacitor 22e in parallel.

As shown, phase compensation circuit 23 may be a typical amplifier which is well known in the art and comprises a transistor 23a, a diode 23b, resistors 23c, 23d and 23e and a voltage supply Vcc. The error signal supplied by the output of loop gain control circuit 22 is fed through resistor 23c to the base of transistor 23a. The output of phase compensation circuit 23 is derived across resistor 23d and supplied to amplitude modulator 24 through resistor 23e.

Thus, the error signal from the comparator circuit 20 is supplied through loop gain control circuit 22 and phase compensation circuit 23 to amplitude modulator 24 whereby the high frequency signal derived from oscillator 15 is changed in amplitude in accordance with the error signal such that the peak value of the electrical signal provided by preamplifier 18 is substantially coincident with that of the level of the reference signal from source 21. Inasmuch as the reference signal is set at a level corresponding to the linear velocity of the recording medium and the sensitivity of the recording material, as described heretofore, any error signal produced by comparator circuit 20 indicates the necessary adjustment of light intensity required to be made to the laser light emission by amplitude modulator 24.

It should also be noted that by widening the high frequency band of photo-detector 17, preamplifier 18, peak-holding circuit 19, comparator circuit 20, loop gain control circuit 22 and phase compensation circuit 23, the present invention can reduce noises, such as ripple signals, caused by a power source and high frequency noises inherent in the helium-cadmium laser.

When the information signal to be recorded has a duty factor of 50%, the light intensity can be controlled by the mean level of the first order diffracted light. However, when the duty factor of the information signal is not 50%, that is, the OFF and ON periods of the signal are not symmetrical, the present invention is quite useful and provides improved recording accuracy.

Therefore, the present invention in contrast to the prior art can use a helium-cadmium laser as the light source 11 while avoiding the need for optical filters and two expensive electro-optic light modulators. Furthermore, the present invention provides signal modulation, utilizes a single inexpensive acousto-optic light modulating element 12, controls the intensity of the light signal which acts on the recording medium, and reduces the noise level produced, for example, by a power source or laser light source 11.

Still further, although the embodiment of the invention, as disclosed heretofore, connects the amplitude modulator 24 between the signal modulator 14 and the high frequency oscillator 15, it should be noted that the amplitude modulator 24 can be connected between the acousto-optic modulating element 12 and the signal modulator 14.

Additionally, the present invention can be modified such that two acousto-optic light modulators are utilized such that one controls the light intensity and reduces the noise emitted from the light source 11 while the other provides signal modulation.

Still further, although a preferred embodiment employs a photo-resist recording material and a helium-cadmium laser light source, the present invention is not limited to such a recording material or light source.

Having described a specific embodiment of the invention with reference to the accompanying drawings, it is to be understood that the invention is not limited to that precise embodiment, and that other embodiments and modifications thereof will become apparent to those skilled in the art and will fall within the scope and spirit of the invention as defined in the following claims.

We claim:

1. A light modulating apparatus for use with a recording means for recording an information signal on a recording medium comprising:
    Acousto-optic modulating means including transducer means for providing an acoustic signal in response to a first electrical signal and light diffracting means for modulating said light emission in response to said acoustic signal so as to provide a modulated light emission for acting on said medium;
    an information signal source for providing an information signal;
    oscillator means for producing a high frequency carrier signal;
    signal modulating means for modulating said carrier signal by said information signal and providing therefrom said first electrical signal to said transducer means;
    detecting means for continuously detecting a portion of said modulated light emission and producing in response thereto a second electrical signal;
    peak-holding means connected to said detecting means and actuable by said information signal for holding substantially a peak value of said second electrical signal;
    comparator means for comparing said peak value of said second electrical signal with a reference signal and providing a corresponding error signal; and
    amplitude modulating means for controlling the amplitude of said high frequency carrier signal in accordance with said error signal.

2. A light modulating apparatus as in claim 1; wherein said light source is a laser.

3. A light modulating apparatus as in claim 2; wherein said light source is a helium-cadmium laser.

4. A light modulating apparatus as in claim 1; wherein said acousto-optic modulating means produces a diffracted, coherent light signal.

5. A light modulating apparatus as in claim 4; wherein said acousto-optic modulating means provides substantially a Brillouin scattering of said diffracted, coherent light signal.

6. A light modulating apparatus as in claim 5; wherein a first order of said diffracted, coherent light signal acts on said recording medium and is detected by said detecting means.

7. A light modulating apparatus as in claim 1; wherein said information and second electrical signals are binary coded.

8. A light modulating apparatus as in claim 1; wherein said carrier signal has a frequency of approximately 80 megahertz.

9. A light modulating apparatus as in claim 1; wherein said light diffracting means has its refractive index varied in response to the pressure of said acoustic signal for providing a light diffraction grating with a pitch corresponding to the wavelength of said acoustic signal such that, as said light emission passes through said light diffracting means, said light emission is diffracted.

10. A light modulating apparatus as in claim 9; wherein said acousto-optic modulating means further includes second transducer means for absorbing the energy of said acoustic signal and dissipating the same as heat.

11. A light modulating apparatus as in claim 9; wherein said first transducing means produces and ultrasonic signal.

12. A light modulating apparatus as in claim 1; wherein said first electrical signal produced by said signal modulating means is in the form of a burst signal having said high frequency of the carrier frequency as the frequency of each burst.

13. A light modulating apparatus as in claim 1; further comprising gain control means for controlling the gain of said error signal.

14. A light modulating apparatus as in claim 1; further comprising phase compensation means connected between said comparator means and said amplitude modulating means for compensating any phase difference between said modulated light emission and said information signal.

15. A light modulating apparatus as in claim 1; further comprising variable voltage means providing said reference signal and being variable in compensation for changes in the sensitivity characteristics of said recording medium and the linear velocity of said modulated light emission in respect to said recording medium.

16. A light modulating apparatus as in claim 1; further comprising preamplifier means connected between said detecting means and said peak-holding means for amplifying said second electrical signal.

17. A light modulating apparatus as in claim 1; further comprising time delay means connected between said information signal source and said peak-holding means whereby sampling of said peak value is synchronized with said information signal.

18. A light modulating apparatus as in claim 1; wherein said acousto-optic modulating means modulates the intensity of said light emission.

19. a light modulating apparatus as in claim 1; wherein said peak value is a direct-current voltage.

20. A light modulating apparatus as in claim 1; further comprising beam-splitting means spatially positioned between said acousto-optic modulating means and said detecting means and which directs a portion of said modulated light emission toward said recording medium.

* * * * *